Oct. 21, 1930.  P. H. CRAIG  1,778,795
ELECTRICAL MEASURING INSTRUMENT
Filed Aug. 12, 1927   3 Sheets-Sheet 1
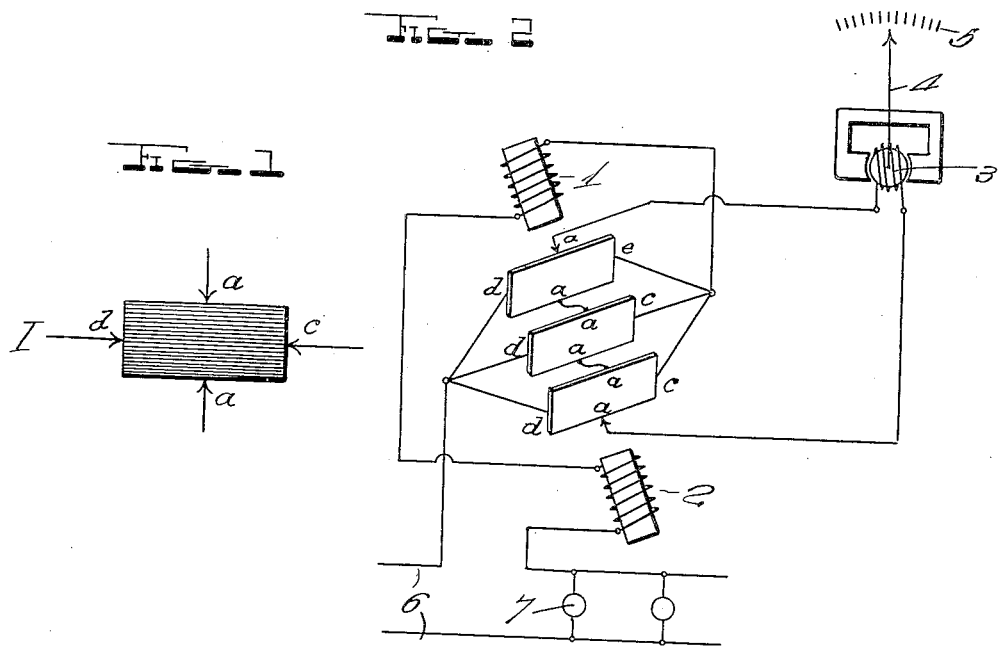
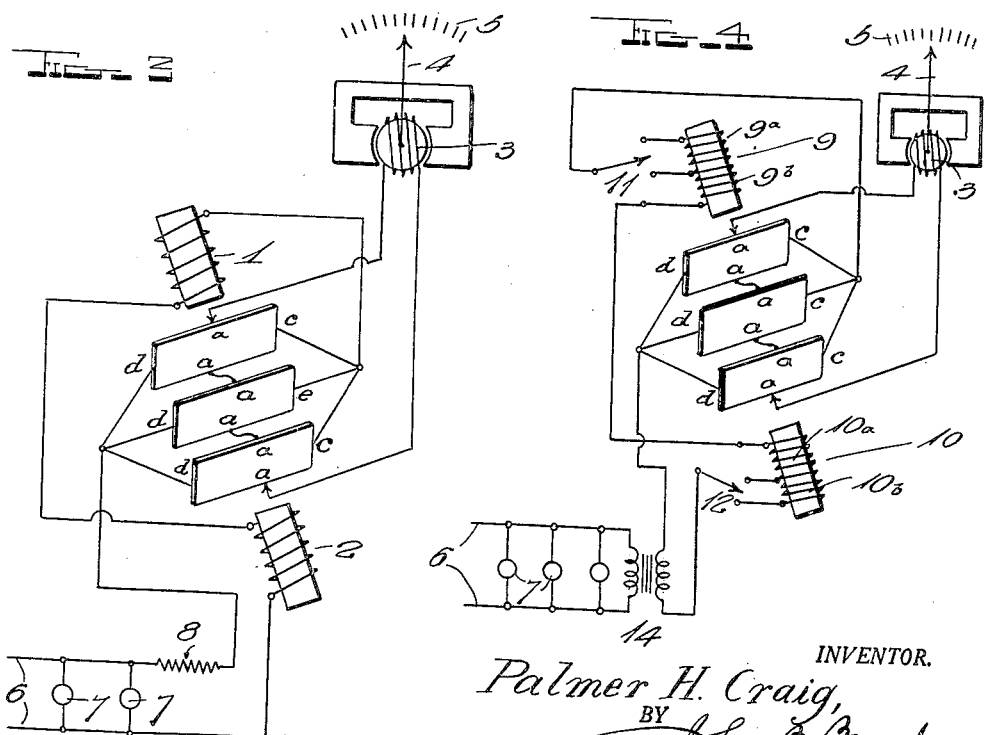
INVENTOR.
Palmer H. Craig,
BY John B. Brady
ATTORNEY.

Oct. 21, 1930.  P. H. CRAIG  1,778,795
ELECTRICAL MEASURING INSTRUMENT
Filed Aug. 12, 1927   3 Sheets-Sheet 2
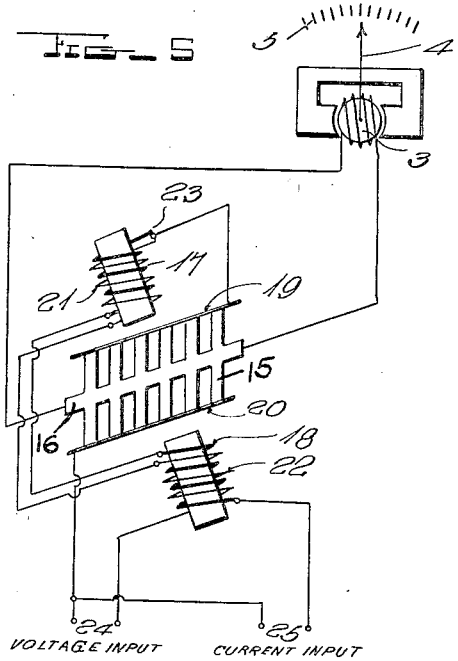
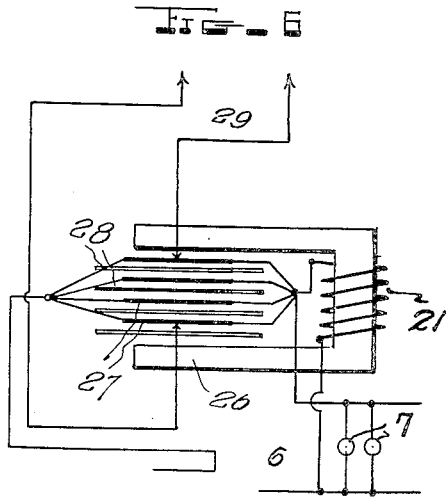
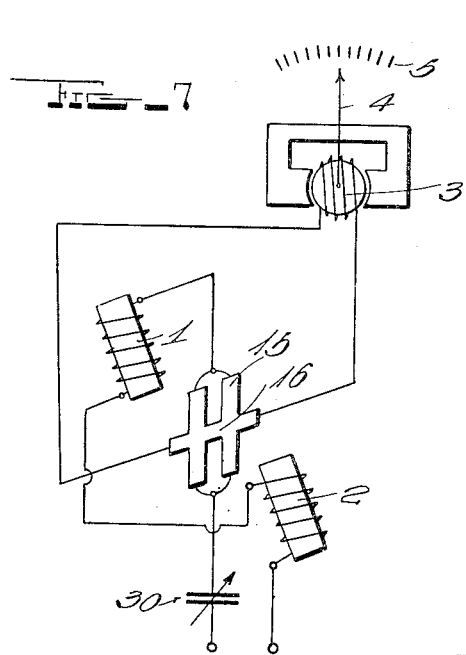
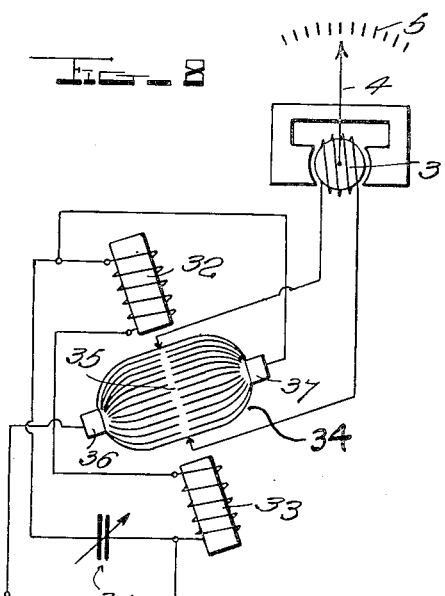
INVENTOR.
Palmer H. Craig
BY John O. Brody
ATTORNEY

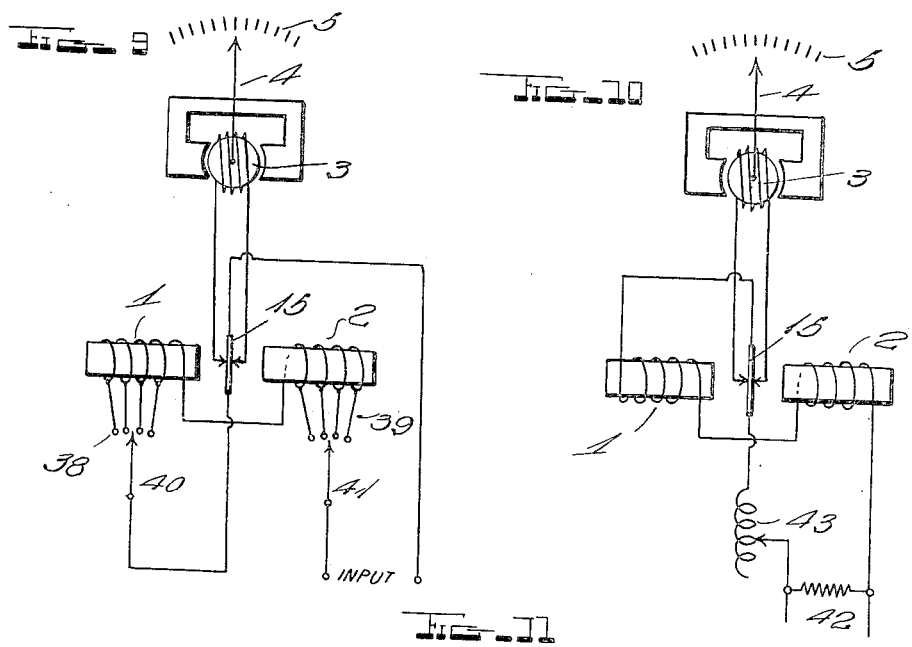
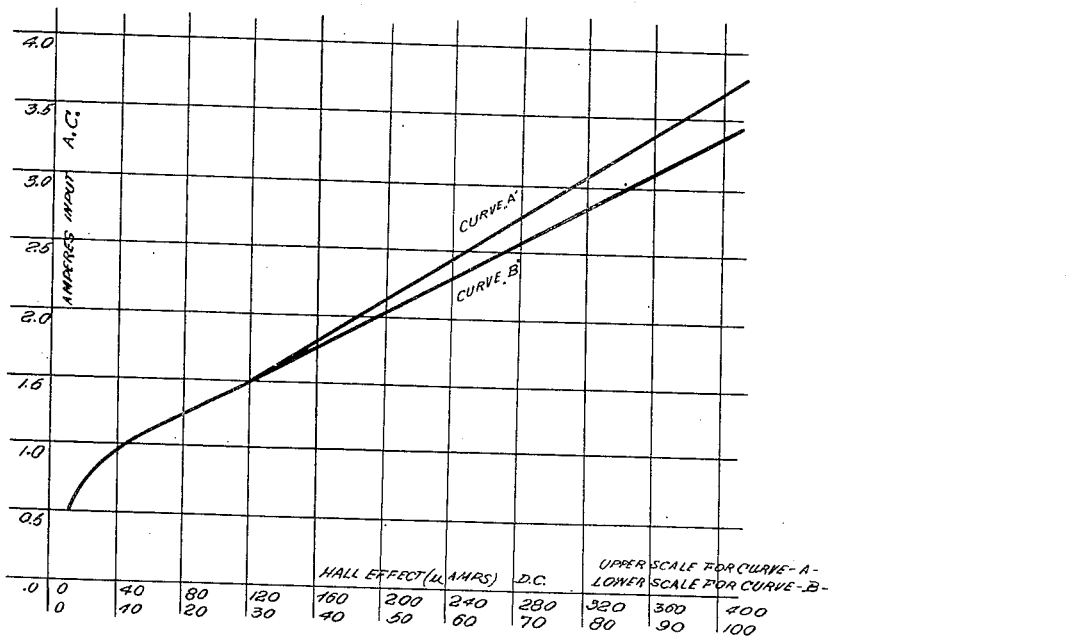

Patented Oct. 21, 1930

1,778,795

UNITED STATES PATENT OFFICE

PALMER H. CRAIG, OF CINCINNATI, OHIO

ELECTRICAL MEASURING INSTRUMENT

Application filed August 12, 1927. Serial No. 212,585.

My invention relates broadly to electrical instruments and more particularly to a measuring instrument employing the "Hall effect", "Corbino effect" or similar phenomena.

One of the objects of my invention is to provide a circuit arrangement for a measuring instrument for accurately determining the value of alternating currents and voltages in which an indicator is movable over a scale which is calibrated with respect to rectified currents produced by means of the "Hall effect," "Corbino effect", or similar phenomena.

Another object of my invention is to provide a meter for reading alternating currents and voltages where the possibility of burning out the meter is extremely remote so that a rugged instrument is secured.

Still another object of my invention is to provide a circuit arrangement for a measuring instrument, wherein the transverse current effect in a metallic film may be measured for unknown potential difference along the longitudinal axis of the metallic film, the meter in the circuit through the transverse axis of the film being calibrated in accordance with the "Hall effect" produced by the passage of the longitudinal current through the film.

A further object of my invention is to provide a "Hall effect" apparatus for measuring both current and voltage in an electrical circuit for determining consumption of power in watts.

Other and further objects of my invention reside in the circuit arrangements described in the specification hereinafter following by reference to the accompanying drawings wherein:

Figure 1 illustrates the type of metallic film used in securing the required "Hall effect" for actuating the measuring instrument employed in the circuit arrangement of my invention; Fig. 2 is a diagrammatic view of the measuring instrument of my invention arranged in a circuit for determining the value of an alternating current supplied to a load circuit; Fig. 3 shows the circuit arrangement of my invention used in the measuring instrument for determining voltage across an alternating current line system; Fig. 4 shows the circuit arrangement by which the meter of my invention may be used interchangeably for measuring values both of current and voltage; Fig. 5 illustrates a circuit arrangement and a modified form of voltage and current measuring device constructed in accordance with my invention; Fig. 6 illustrates the circuit arrangement of my invention as applied to a wattmeter; Fig. 7 shows a circuit arrangement embodying the principles of my invention having capacitative reactance arranged in the input circuit for predetermining the flux relations between the longitudinal current and the magnetic flux across the metallic films; Fig. 8 illustrates a photographically prepared "Hall effect" member having a tuned input circuit; Fig. 9 illustrates a meter circuit wherein the flux between the pole faces constituting the magnetic field may be suitably controlled; Fig. 10 illustrates a circuit arrangement having an external shunt across the "Hall effect" device with inductive reactance for controlling the relationship between the longitudinal current and the magnetic flux; and Fig. 11 shows characteristic curves illustrating the operation of the apparatus of my invention.

My invention makes use of the "Hall effect", "Corbino effect" and similar electromagnetic phenomena for the rectification of alternating currents and the impression of the rectified current upon a meter which is calibrated in accordance with the "Hall effect."

The "Hall effect" consists, briefly, of an electromagnetic phenomena observable when a strip or film of metal carrying a longitudinal current I, (Fig. 1) is placed in a magnetic field perpendicular to the plane of such a strip, a transverse potential difference being set up between the edges $a$, $a'$ of the strip, this difference of potential being approximately, under normal conditions, represented by the formula:

$$E = \frac{HI}{d}$$

where
- $E$ = the transverse potential difference;
- $I$ = the current (longitudinal) through the strip;
- $d$ = the thickness of the strip;
- $H$ = the magnetic field strength.

The "Corbino effect" is similar to the "Hall effect", except that a radial current is produced in a circular disc subjected to a magnetic field perpendicular to the plane of the disc.

I have described the "Hall effect" in more detail in my copending application Ser. No. 121,394, filed July 9, 1926, and in my British Letters Patent No. 274,112, accepted March 1, 1928 and French Letters Patent No. 639,801, dated July 19, 1927. In the said application and patents I have shown various circuits for utilizing the "Hall effect," "Corbino effect" and similar electromagnetic phenomena wherein a multiplicity of conductive films are subjected to the passage of electromagnetic lines of force which extend substantially perpendicular to the plane of the films, the films being connected in an electrical circuit whereby the longitudinal current is caused to flow through the films for deriving a current, which in the case of polygonal shaped plates is transverse to the longitudinal current and is known as "Hall effect" while in the case of circular disks there is a circularatory current known as the "Corbino effect."

I have discovered that if a plate or film of metal such as bismuth, tellurium, bismuth-antimony alloy, or any other metal alloy, be connected as shown in the drawings, the device will act as an electrical rectifier of impressed alternating currents. I connect the metallic films or plates along their longitudinal axes with the circuit in which the unknown value of current or potential difference is to be measured. The resulting rectified energy existent across the transverse axes of the films is conveyed to a meter circuit for securing a proportional deflection of the meter by reason of the "Hall effect" for the measurement of the current or potential difference across the longitudinal axes of the films or plates. "Hall effect" may be observed when the magnetic field is in any direction with respect to the plates except when the magnetic field is parallel to the plates, but a longitudinal change of resistance results even in this latter case.

Referring to the drawings, Fig. 1 illustrates one of the films or plates by which the "Hall effect" is measured by the indicating meter. The alternating current from the circuit wherein the characteristics of the energy is to be measured is sent through the strips along the longitudinal axes represented by $d$, $c$. In one-half of the cycle, the current flows in the direction $c$ to $d$, while in the other half of the cycle, the direction of the current is reversed through the films. The rectified current or "Hall effect" current is taken off by an output circuit connected across points $a$—$a$.

In Fig. 2 I have shown a plurality of films having their surfaces extending in parallel planes and insulated one from the other with their longitudinal axes connected in parallel and their transverse axes connected in series. An electromagnetic field is produced perpendicular to the films and is constituted by electromagnets 1 and 2 having their windings connected in series. The transverse axes of the films which are connected in series are connected to the terminals of the direct current measuring instrument 3 having an indicator 4 thereon arranged to move over a scale 5 which is calibrated in proportion to the "Hall effect" produced in the films proportional to the currents in the circuit 6. The circuit 6 is shown connected to any suitable form of load represented at 7. For measuring current from the circuit 6, the apparatus of my invention is connected in series with the load so that the circuit extends through the winding of electromagnet 2, the winding of electromagnet 1 and through the longitudinal axes of the plurality of films returning to the power supply circuit 6. The "Hall effect" by which the transverse current is produced laterally of the films operates the measuring instrument 3.

In Fig. 3 I have shown one of the arrangements of the apparatus of my invention for measuring voltage across circuit 6. A resistance 8 is shown inserted in series with the line or an electromagnetic winding on the electromagnets 1 and 2 may be provided having an inductive reactance which is large enough to maintain the current at relatively low values.

In Fig. 4 I have shown a universal measuring instrument for determining both voltage and current. In this arrangement the electromagnetic fields are constituted by windings 9 and 10 which are divided into two sections, $9^a$, $9^b$, $10^a$ and $10^b$ by means of switching devices shown at 11 and 12 for including predetermined reactances in the supply line, so that the apparatus can be used in connection with a transformer system represented at 14 to supply such voltage or current across or through the longitudinal axes of the films as will permit the proper operation of the indicating meter. The electromagnetic windings 1 and 2 or 9 and 10 are provided with laminated magnet cores, and when the electromagnets reach saturation throughout the working range of the meter, the scale readings at 5 will be directly proportional to the current, and this is often true when the cores are not saturated. The plates are designed for a predetermined output of "Hall effect," so that regardless of the value of current sent through the longitudinal axes of the plates, it is impossible to burn out the direct current meter to which the rectifier element is connected. I insure against the burning out of the direct current meter to which the rectifier element is connected by employing a magnetic core material for the electromagnetic windings about the films. The transformer system 14 may be designed to step down the voltage and step up the current, or vice versa to whatever values are required. The transformer becomes magnetically saturated and may have a sufficient ratio between the primary and secondary terminals to serve as the proper impedance in both the line circuit and the measuring circuit for securing required readings on the meter.

I may employ a modified method of rectification using the "Hall effect," that is, operating on the lower portion of the permeability curve of the core material. That is, either the core of the transformer 14 or the cores of the electromagnetic systems 1—2 or 9—10. By use of the dissymmetry of the permeability curve partial rectification may be obtained without connecting the electromagnetic system and the films or plates in series.

In Fig. 5 I have shown the "Hall effect" plates consisting of metallic members 15 located side by side and connected laterally by portions 16. The electromagnetic systems comprise windings 17 and 18 connected in series and with the longitudinal axis of each of the plate members 15 by means of conductor 19 which connects to the ends of the plate members 15, and the other ends of the plate members 15 are connected through conductor 20 with the input circuit. Windings 21 and 22 forming part of the electromagnetic system are also connected in series with the longitudinal axis of the plates 15. The two independent windings are bonded at 23 and form a voltage input circuit, with terminals at 24 and a current input circuit with terminals at 25 which may be conveniently connected to the input circuit for measuring voltage or current on the same instrument which may be suitably calibrated on separate scales for this purpose.

In Fig. 6 I have shown a wattmeter circuit embodying the principles of my invention wherein a magnetic core member 26 has a plurality of conductive films 27 disposed in parallel relationship and insulated by means of separators 28 located between the pole faces thereof. A voltage coil 21 is disposed on the core structure 26 and connected to the circuit 6 and load 7 as to measure the voltage across the line. The longitudinal axes of the film are disposed in series with the load. The "Hall effect" is directly proportional to the product of the longitudinal current times the magnetic field intensity. One of these quantities is supplied by the voltage connection across the line, and the other is supplied by the current connection in series with the line. From the elementary formula of the "Hall effect" the output is proportional to the longitudinal current times the magnetic field, and in the arrangement of Fig. 6 the "Hall effect" output is proportional to the input voltage times the input current times the power factor (i. e. cos. $\phi$). In this way power may be measured utilizing the "Hall effect."

In Fig. 7 I have illustrated the location of a capacitative reactance 30 in the input circuit of the apparatus which is adjustable to predetermine the flux relationships between the longitudinal current and the transverse magnetic field. The capacitative reactance 30 serves to tune the inductive reactance of the field windings 1 and 2 to resonance with the frequency of the current being measured thus making use of the higher field and plate currents which are produced. For example, if a radio frequency current of 1,000 kilocycles is being measured, condenser 30 is adjusted so that the capacitative reactance thus arbitrarily added just balances the inductive reactance of the field winding with a resultant amplified current through the field winding and plates in which the "Hall effect" is produced.

In Fig. 8 I have shown an arrangement of tuned circuit 31 across the windings 32 and 33 disposed on opposite sides of the "Hall effect" grid 34. The grid illustrated in Fig. 8 is produced by a photographic process where a bismuth plate is etched to provide a plurality of conductive paths separated one from the other, connected at opposite ends 36 and 37 and connected centrally along the transverse axis thereof, as represented at 35. The condenser 31 serves to tune the inductive reactance of the field windings 32 and 33 for rendering the meter selective to a particular frequency. While the arrangement in Fig. 7 employs the principle of resonance, the circuit arrangement in Fig. 8 operates upon the principle of anti-resonance, the result being that in the circuit of Fig. 7 the source of current must supply the larger resonant current since this source is in series with the resonant circuit, whereas in Fig. 8, for a relatively small input it is possible to obtain relatively large currents flowing in the local resonant circuit which is completed through condenser 31 and field windings 32 and 33. It should be noted that the resonant current is effective through both field and plates in the arrangement of Fig. 7 but in the arrangement of Fig. 8 the resonant current is effective only through the field.

In Fig. 9 I have shown the electromagnetic systems 1 and 2 having taps 38 and 39 on the inductances which form part of the magnetic field with switching members 40 and 41 for obtaining a predetermined number of turns in the circuit. The "Hall effect" plate has been shown in end view at 15.

In Fig. 10 I have shown the input circuit of the meter shunted by means of the external shunt 42 with inductive reactance 43 in the input circuit for regulating the relation of the longitudinal current with respect to the magnetic field.

In Fig. 11 I have illustrated the characteristic curves obtained in the operation of a meter system in accordance with my invention, wherein the "Hall effect" produced by a given current input is shown plotted with respect to two different scales on the measuring instrument. The curves in Fig. 11 were plotted while utilizing a circuit arrangement according to Fig. 7. Curve A was obtained using "Hall effect" films of pure bismuth which were formed by rapidly cooling the plates after the metal had been poured into the mold in a molten condition. Curve B was obtained by the use of plates which had been formed by the slow cooling of impure bismuth plates previously cast in molds. The presence of impurities therefore decreases the "Hall effect" as will be seen from a study of the differences between curves A and B. Therefore, great care must be used to prevent contamination of the metal while being molded because practically any impurity produces much lower outputs. This statement, however, does not apply to small quantities of a few metals as I have found that eight per cent of antimony added to the bismuth tends to increase the "Hall effect".

It will be understood that the plates used may be disposed either in stacked relationship or side by side. The plates may be metal, crystals or alloys possessing "Hall" or "Corbino effects".

I have found the measuring instrument of my invention accurate in its readings, and rugged and stable in its operation.

Wherever in the claims I have mentioned "Hall effect," I also intend by this expression to include the "Corbino effect." I have used the expression "galvanomagnetic effects" to include both the expressions "Hall effect" and "Corbino effect."

While I have described my invention in certain of its preferred embodiments, I desire that it be understood that modifications may be made and that no limitations are intended other than are imposed by the scope of the appended claims.

What I claim as new and desire to secure by Letters Patent of the United States is as follows:

1. An instrument for measuring electrical quantities comprising a multiplicity of metallic films having their longitudinal axes disposed parallel one to another and their transverse axes connected in common, a circuit whose energy is to be measured, independent connections for applying voltage to be measured extending from said circuit to the ends of the longitudinal axes of said films, and separate connections for applying current to be measured to the ends of the longitudinal axes of said films, an indicating meter, and connections extending from the ends of the transverse axis of each of said films in series to said indicating meter.

2. The method of measuring electrical quantities, which consists in developing a "Hall effect" in metallic films from the electrical energy whose quantity is equal to the product of the impressed voltage multiplied by the current flow through the metallic films and in measuring the amount of "Hall effect" thus produced.

3. In an electrical measuring system an indicating meter, a circuit responsive to electrical energy whose quantity is to be determined, and a device interposed between said circuit and said indicating meter for developing galvanomagnetic effects proportional to the product of the impressed voltage across the device and current flow through said device and circuit connections for exciting said indicating meter by means of the resultant current derived from said "Hall effect."

4. In combination an electrical measuring instrument, a plurality of metallic films arranged in side by side relationship, each of said films having longitudinal and transverse axes, with the longitudinal axes thereof connected in parallel and the transverse axis thereof connected in series, an indicating meter connected to the transverse axes of said metallic films and means for impressing a voltage to be measured across the longitudinal axes of said metallic films and separate means for passing current to be measured through the longitudinal axes of said films for generating therein a "Hall effect" in proportion to the value of the product of the impressed electrical quantities dependent separately upon a voltage across a load and current passing to a load for deriving a uni-directional current in the series circuit including the transverse axes of said films and actuating said indicating meter.

5. In an electrical measuring system a direct current meter, a member possessing galvanomagnetic effects connected therewith, a magnetic field adjacent said member, and means for controlling the influence of said magnetic field upon said member in proportion to the product of the voltage and current existent in the circuit under measurement.

6. An electrical measuring system comprising a direct current meter, an alternating current circuit, a member possessing galvanomagnetic effects, a pair of electromagnetic windings enclosing said member and controllable by the voltage and current impressed thereon from said alternating current circuit, a circuitous path through said electromagnetic windings and said member, variable impedance means for controlling the relation between the flux developed by said electromagnetic windings and the current through said member, and connections between said meter and said member for measuring the amplitude of current generated in said member.

7. A measuring instrument comprising a magnet, an electromagnetic winding thereon, a "Hall effect" plate extending across the field of said magnet, a load circuit, connections between said load circuit and said electromagnetic winding through the longitudinal axis of said "Hall effect" plate in series, independent connections between said load and the longitudinal axis of said "Hall effect" plate, and a meter for indicating the "Hall effect" across the transverse axes of said plates.

8. An electrical measuring instrument comprising a magnet, an electromagnetic winding thereon, a "Hall effect" plate disposed in the field of said magnet, a meter connected across the transverse axis of said "Hall effect" plate, a load circuit, and independent connections between said load circuit, said "Hall effect" plate, and said electromagnetic winding, one of said connections impressing the potential of said load circuit across said electromagnetic winding and the longitudinal axis of said "Hall effect" plate in series and the other of said connections including a series path from said load circuit through the longitudinal axis of said "Hall effect" plate.

9. An electrical measuring instrument comprising a magnetic member, a "Hall effect" plate disposed in the field thereof, a measuring instrument connected with the transverse axis of said "Hall effect" plate, an electromagnetic winding disposed on said magnetic member, a load circuit, connections for applying the potential of said load circuit across said electromagnetic winding, and independent connections for passing the current to said load circuit through the longitudinal axis of said "Hall effect" plate.

10. An electrical measuring instrument comprising a magnetic member, an electromagnetic winding disposed thereon, a multiplicity of "Hall effect" plates disposed within the field of said magnetic member, said "Hall effect" plates having their transverse axes connected in series and connected with a measuring instrument, said "Hall effect" plates having their longitudinal axes connected in parallel, a load circuit, and means for applying the potential of said load circuit across said electromagnetic winding and simultaneously passing the current to said load circuit through the parallel connected longitudinal axes of said "Hall effect" plates.

In testimony whereof I affix my signature.

PALMER H. CRAIG.